United States Patent
Behan

(10) Patent No.: US 7,114,413 B1
(45) Date of Patent: Oct. 3, 2006

(54) PORTABLE BAND SAW SHARPENER

(76) Inventor: Robert J. Behan, Back Yard Industries, Ltd., Courtenay, BC (CA) V9J 1Y3

( * ) Notice: Subject to any disclaimer, the term of this patent is extended or adjusted under 35 U.S.C. 154(b) by 0 days.

(21) Appl. No.: 11/212,780

(22) Filed: Aug. 29, 2005

(51) Int. Cl.
B23D 63/12 (2006.01)

(52) U.S. Cl. ............................ 76/89; 76/77; 451/349; 451/439

(58) Field of Classification Search ............... 76/37, 76/43, 45, 50.2, 74, 77, 82, 88, 89; 451/349, 451/439
See application file for complete search history.

(56) References Cited

U.S. PATENT DOCUMENTS

| 1,494,995 | A |   | 5/1924  | Craddock   |        |
|-----------|---|---|---------|------------|--------|
| 1,717,206 | A |   | 6/1929  | Grosskopf  |        |
| 2,434,691 | A | * | 1/1948  | Fields     | 76/37  |
| 3,661,037 | A |   | 5/1972  | Athanasoulas |     |
| 3,985,048 | A | * | 10/1976 | Idel       | 76/43  |
| 4,082,014 | A |   | 4/1978  | Idel       |        |
| D250,086  | S |   | 10/1978 | Granberg   |        |
| D272,985  | S |   | 3/1984  | Beerens    |        |
| 5,048,236 | A | * | 9/1991  | Williams   | 451/11 |
| 5,257,563 | A |   | 11/1993 | Hutchinson |        |
| 5,274,957 | A | * | 1/1994  | Jeranson   | 451/130|
| 5,941,138 | A |   | 8/1999  | Beck       |        |
| 6,631,658 | B1|   | 10/2003 | Brown      |        |
| 6,958,004 | B1| * | 10/2005 | Helland    | 451/48 |

FOREIGN PATENT DOCUMENTS

WO     WO89/11937     12/1989

* cited by examiner

*Primary Examiner*—Hwei-Siu Payer
(74) *Attorney, Agent, or Firm*—Richard C. Litman

(57) ABSTRACT

The portable band saw sharpener includes a frame for receiving a saw blade that is to be sharpened. A hand-operated motor is pivotally mounted to the frame for driving a grinding wheel, which engages the teeth of the saw blade. A hand-operated structure releasably holds the saw blade in place during the sharpening of the saw teeth, and the motor is guided along a path matching the contour of the saw blade teeth by a cam and an interchangeable cam track, which may be adjusted for saws of various contours and dimensions. The portable band saw sharpener is adjustable, hand-operated and portable.

13 Claims, 4 Drawing Sheets

PORTABLE BAND SAW SHARPENER

BACKGROUND OF THE INVENTION

1. Field of the Invention

The present invention relates to a portable band saw sharpener having a portable frame for receiving a saw blade. A hand-operated motor powers a grinding disc, and structure is provided, allowing for the selective and adjustable sharpening of the saw blade.

2. Description of the Related Art

Sharpening devices for saw blades are often bulky and permanently fixed, designed for mounting in industrial factories and tool shops. The sharpeners produce a great burden in terms of time and energy expenditure when such devices are to be transported, assembled or repaired. Additionally, these permanently fixed blade sharpeners are designed for the sharpening of a particular blade or tool type, they are not adaptable to multiple types of blades of varying sizes.

It is desirable to have a sharpening device capable of sharpening the teeth of multiple types of saw blades, in various configurations and sizes. Further, since saw blades are used in a wide variety of locations, from factories to outdoor construction sites, it is also desirable to provide an easily transportable saw blade sharpener.

Thus, a portable band saw sharpener solving the aforementioned problems is desired.

SUMMARY OF THE INVENTION

The portable band saw sharpener includes a frame for receiving a saw blade that is to be sharpened. The frame includes a pair of plates secured to one another, forming a groove or slot that receives the saw blade. A hand-operated motor is pivotally mounted to the frame for driving a grinding wheel, which engages the teeth of the saw blade. A hand-operated locking structure holds the saw blade in place during the sharpening of the saw teeth through releasable and selective engagement with the troughs formed between the saw teeth. The motor and grinding wheel are guided along a path matching the contour of the saw blade teeth by a cam and an interchangeable cam track, which may be adjusted for saws of various contours and dimensions. The user may disengage both the grinding disc and the locking structure from the saw blade in order to advance the saw blade through the frame. The band saw sharpener is adjustable, hand-operated and portable, providing portable sharpening for a wide variety of saw blade types and sizes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
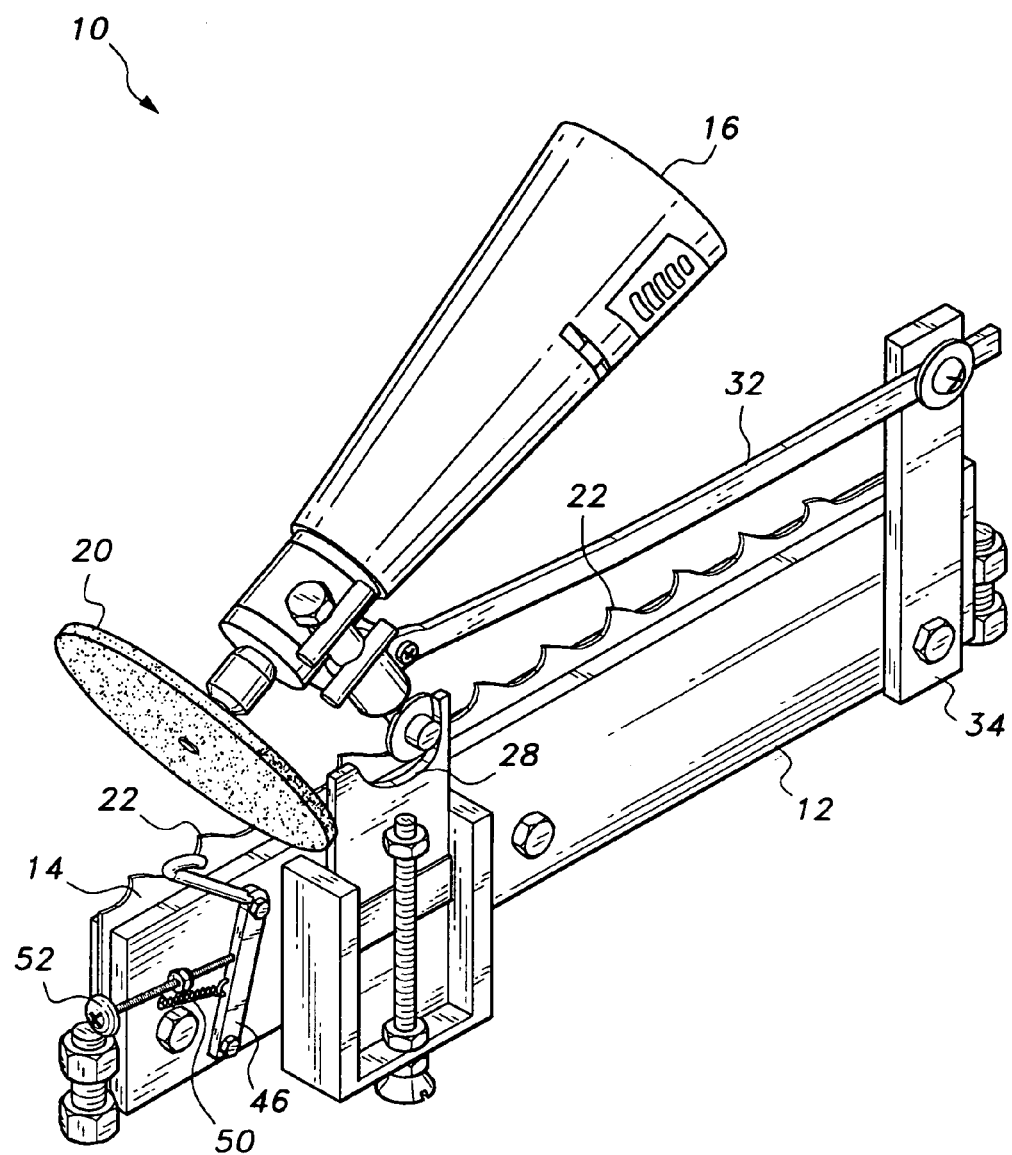
FIG. 1 is a perspective view of a portable band saw sharpener according to the present invention.

Referring now to FIGS. 1–4, the portable band saw sharpener 10 includes a frame 12 for receiving a saw blade 14, which is to be sharpened. Frame 12 includes a pair of plates 66, which are secured to one another by securements 38, 70, which may be screws, bolts, rivets or the like. Although frame 12 may have any suitable dimensions, as desired by the user, in the preferred embodiment, each plate 66 has a height of approximately 2 inches and a length of approximately 10½ inches. A gap of approximately 0.070 inches is formed between plates 66, in the preferred embodiment, allowing for the reception therebetween of saw blade 14. The frame 12 preferably has a thickness of ¼ inch and is preferably formed of steel. As will be described in further detail below, securements 38 also provide for the pivotal mounting of support bar or rod 34.

As shown in FIG. 1, saw blade 14 is received between plates 66 of frame 12. As best shown in the side views of FIGS. 2 and 4, the saw blade 14 is held between plates 66 and is further vertically positioned for sharpening by height adjustments screws 54. Height adjustment screws 54 provide a support surface for the lower edge of saw blade 14 and are also adjustable through their threaded engagement with corresponding fasteners 56. Thus, saw blades of varying heights may be inserted between plates 66 while maintaining the projection of saw blade teeth 22 above the top edge of plates 66. Fasteners 56 are secured to frame 12 through welding or any other suitable method.

Figure 2:
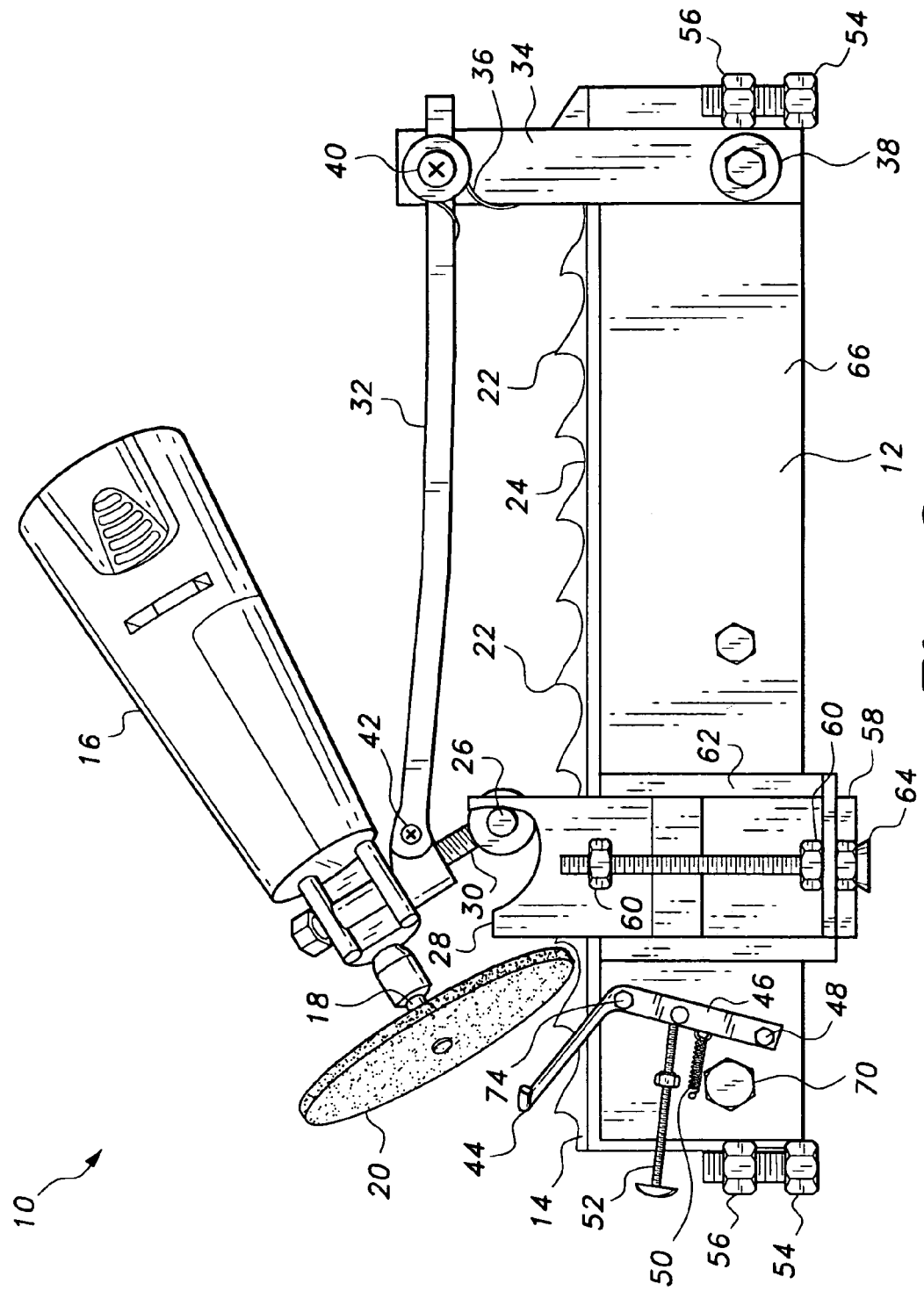
FIG. 2 is a side view of the portable band saw sharpener engaging a saw blade.

Fasteners 56 may be threaded nuts or the like and, as shown in FIG. 2, are mounted on opposing lower ends of frame 12. Height adjustment screws 54 are threaded to provide adjustable engagement with fasteners 56, thus providing an adjustable height support surface for saw blade 14.

Figure 3:
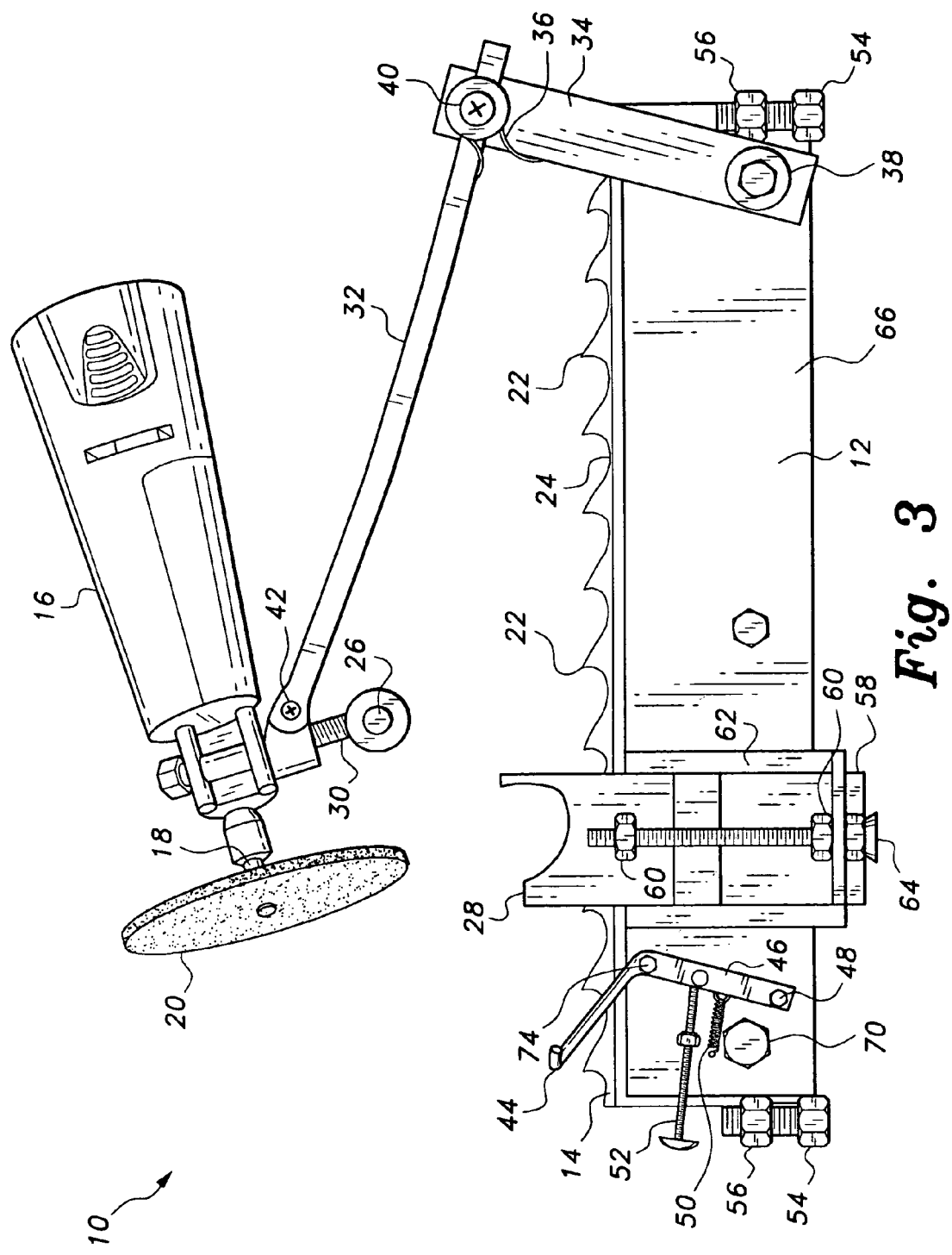
FIG. 3 is a side view of the portable band saw sharpener disengaged from the saw blade.
Figure 4:
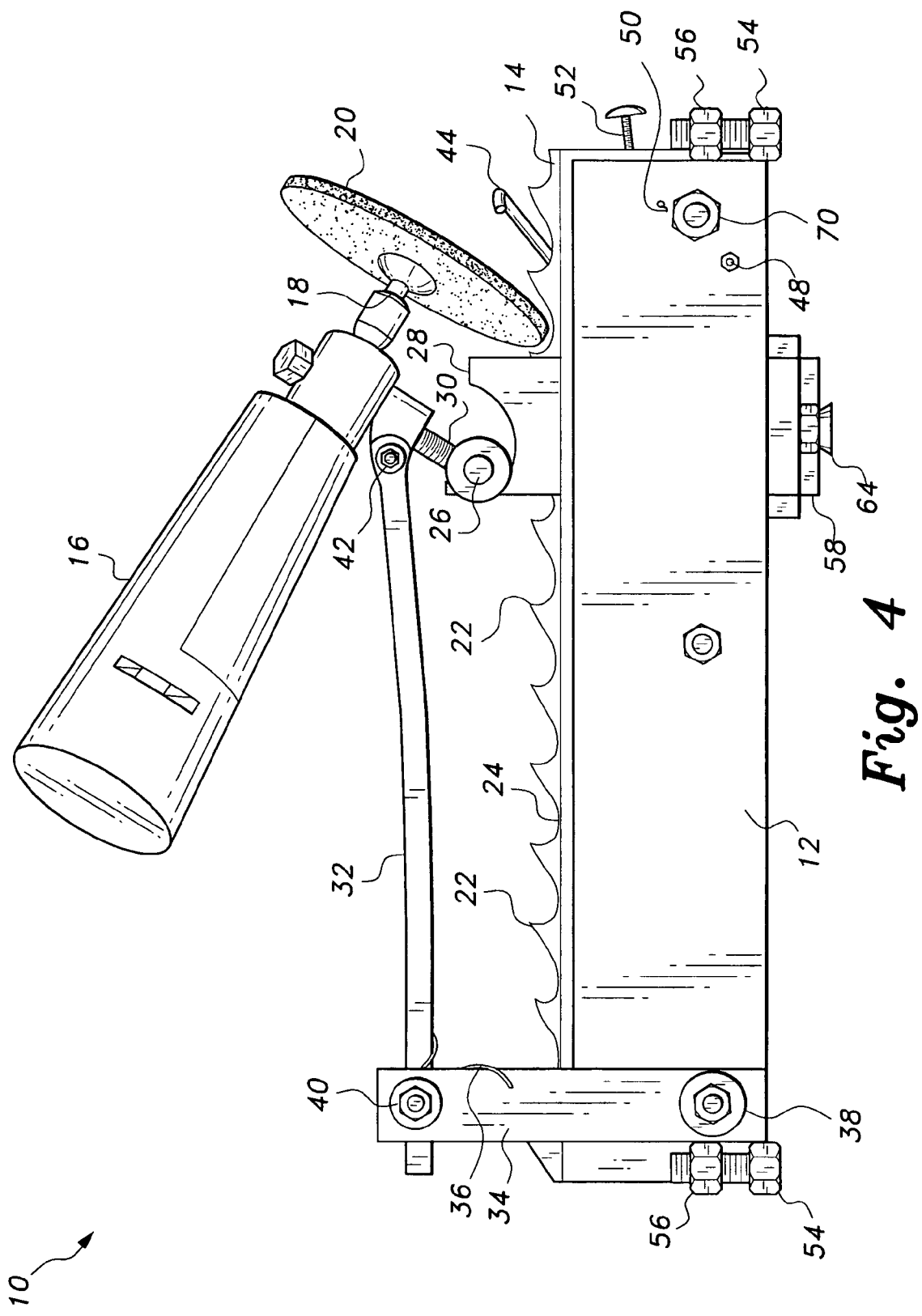
FIG. 4 is a side view of the subject portable band saw sharpener.

As shown in FIGS. 2 and 3, a motor 16 is mounted to frame 12 through a pair of support bars or arms 32, 34. In the preferred embodiment, motor 16 is a DC electrical motor operating on rechargeable batteries, allowing system 10 to be portable and efficiently powered. Motor 16 is pivotally mounted on a first end of support arm 32 by a pivoting securement member 42. Securement member 42 may be a screw, bolt, rivet or the like. Motor 16 is capable of pivoting about securement arm 32 in order to selectively engage and disengage the teeth 22 of saw blade 14. Securement arm 32 may have a grip formed thereon in order to effectuate secure and stable grasping and operation by the user.

A grinding disc 20 is mounted on a rotational axle 18 of motor 16. The grinding disc sharpens teeth 22 of saw blade 14 through rotational abrasion. Motor 16 may be user-controllable to selectively control the angular velocity of grinding disc 20. Though any suitable grinding disc may be utilized, in the preferred embodiment, a commercially available 3-inch diameter grinding disc is used. Grinding disc 20 is removably mounted on rotational axle 18, allowing for the replacement thereof in order to accommodate various types of saw blades 14.

Support arm 32 is joined at a second end to support arm 34. Support arms 32, 34 are joined to one another through a pivoting securement member 40 similar to securement member 42. As best shown in FIG. 2, a spring 36 is provided for biasing support arm 32 against support arm 34. In the preferred embodiment, spring 36 is a light wire spring, though any suitable elastic biasing means may be utilized. Though any suitable dimensions for support arm 34 may be used, as defined by the needs of the user, in the preferred embodiment, the support arm 34 has a length of approximately 4 inches, allowing enough clearance such that grinding wheel 20 does not cause damage to saw blade 14, but can easily engage teeth 22 of saw blade 14. Similarly, in the preferred embodiment, support arm 32 has a length of approximately 7 inches. Support arms 32, 34 are formed of 3/16 inch thick steel in the preferred embodiment, thus providing strength and stability for the support of motor 16, but maintaining the portability of system 10 through the use of light-weight materials.

Further, support arm 34 is pivotally joined to frame 12 through securement 38, which may take the form of a screw, bolt, rivet or the like. FIG. 2 illustrates the positioning of support arms 32, 34 when grinding disc 20 engages a tooth 22 and FIG. 3 shows the pivoting of support arms 32, 34 to disengage grinding disc 20 from teeth 22.

Saw blade 14 is horizontally secured during the sharpening process by hook member 44. During grinding, when it is necessary for saw blade 14 to be still with respect to frame 12, hook member 44 engages one of troughs, or gullets, 24, formed between adjacent teeth 22 of saw blade 14. Hook member 44 is pivotally secured to a pivot bar 46, as shown in FIGS. 2 and 3, by swivel pin 74, which may be a screw, bolt, nut or the like. On an opposite end, pivot bar 46 is pivotally secured to frame 12 by a similar securement 48. An actuator 52 having a push button formed thereon is secured to pivot bar 46 and a spring 50 biases pivot bar 46 against frame 12. Actuator 52 is shown as a screw in the preferred embodiment of the Figures, though it should be understood that this is for exemplary purposes only, and actuator 52 may be any suitable device for providing force to pivot bar 46. It should be further noted that hook member 44 freely pivots with respect to pivot bar 46, with hook member 44 being pivotally secured to pivot bar 46 through interconnection with swivel pin 74.

As shown in FIG. 3, when grinding wheel 20 is disengaged from saw blade 14, and it is desired to advance saw blade 14 through frame 12, the push button actuator 52 may be depressed by the user. Pivot bar 46 pivots about pivot point 48, causing hook member 44 to release trough 24, allowing saw blade 14 to be moved horizontally within frame 12, advancing the saw blade 14 to the next tooth to be sharpened.

As further shown in FIGS. 2 and 3, a mounting track 62 is secured to frame 12. Mounting track 62 receives an interchangeable cam guide 58. In the preferred embodiment, mounting track 62 is formed of steel welded to frame 12 and has a thickness of approximately ¼ inch. Fasteners 60, which may be threaded nuts, receive a locking member 64, which may be a threaded screw, bolt or the like, in order to releasably lock cam guide 58 to frame 12, thus allowing cam guide 58 to be removed and replaced. Cam guide 58, in the preferred embodiment, is formed of steel having a thickness of approximately ⅛ inch.

As shown in FIG. 2, a cam mount 30 projects downwardly from motor 16 along an end adjacent to grinding wheel 20. A cam 26 is rotatively mounted on cam mount 30 for reception by, and engagement with, a guide track 28 formed in cam guide 58. In use, the user pushes motor 16 along a path guided by the engagement of cam 26 with guide track 28, thus urging grinding wheel 20 to abrasively sharpen saw blade 14 along a path formed with the same contour and dimensions of teeth 22 and troughs 24. In the preferred embodiment, cam 26 has a diameter of approximately 3/16 inches.

Guide track 28 has the same contouring as teeth 22 and troughs 24 of saw blade 14. Cam guide 58 is replaceable and interchangeable with similar cam guides having guide tracks 28 dimensioned and contoured for the sharpening of other saw blades. Thus, by producing a wide variety of cam guides 58 having a selective variety of guide tracks 28, blade sharpener 10 may be used with any saw blade 14.

In use, the user inserts saw blade 14 between plates 66 of frame 12. Initially, the saw blade sharpener should be in the position shown in FIG. 3, with both grinding wheel 20 and hook member 44 not engaging saw blade 14, to allow for adjustment of saw blade 14 within frame 12. Height adjustment screws 54 are adjusted so that teeth 22 and troughs 24 of saw blade 14 project above frame 12 for engagement with grinding disc 20. Height adjustment screws 54 allow for the insertion and adjustment of a saw blade having any reasonable height.

A cam guide 58 having a guide track 28 matching the dimensions and contouring of saw blade 14 is selected and inserted into mounting track 62. Cam guide 58 is secured against frame 12 through engagement of locking member 64 with fasteners 60.

When sharpening is to commence, the user depresses actuator 52, urging hook member 44 to engage with a trough 24, thus stabilizing saw blade 14 in the horizontal direction. With the other hand, the user directs motor 16 such that cam 26 engages guide track 28. When motor 16 is turned on, the user urges cam 26 to follow the path defined by guide track 28, thus causing grinding wheel 20 to sharpen a path defined by a pair of adjacent teeth 22 and a trough 24 of saw blade 14.

When the user wishes to sharpen the next pair of adjacent teeth, motor 16 is turned off, the cam 26 is released from guide track 28, as shown in FIG. 3, and actuator 52 is released to disengage hook member 44 from trough 24. The user slides the saw blade 14 horizontally through frame 12 to position the new pair of teeth 22 below the grinding wheel 20 and the process is repeated.

Through the hand-operation of motor 16 and actuator 52, along with the dimensions of system 10 and the use of rechargeable batteries in motor 16, a portable, easy to use band saw blade sharpener is provided. Actuation of both the motor and the actuator 52 are performed through simple, easy-to grasp hand maneuvering.

It is to be understood that the present invention is not limited to the embodiments described above, but encompasses any and all embodiments within the scope of the following claims.

I claim:

1. A portable band saw sharpener, comprising:
   a frame for receiving a saw blade, said frame having first and second plates secured to one another, said first and second plates having a gap formed therebetween for removably receiving said saw blade;
   a motor pivotally mounted to said frame;
   a grinding disc rotationally mounted to a drive axle of said motor, said motor driving said grinding disc, said grinding disc engaging teeth of said saw blade for selective sharpening of said teeth;
   a cam rotatably mounted to said motor;
   a cam guide mounted on said first plate of said frame, said cam guide having a guide track formed therein, said cam releasably engaging said guide track for guiding said grinding disc along a contour of one of said teeth of said saw blade; and
   locking means for releasably engaging a trough formed between adjacent ones of said teeth of said saw blade, whereby, during sharpening, a user pivots said motor such that said grinding disc engages one of said teeth of said saw blade and actuates said locking means to engage said trough, said locking means being disengaged and said motor being pivoted away from said saw blade when the saw blade is advanced in said frame to sharpen another one of said teeth.

2. The portable band saw sharpener as recited in claim 1, further comprising a first pivotal mounting rod, said motor being pivotally mounted to said pivotal mounting rod.

3. The portable band saw sharpener as recited in claim 2, further comprising a second pivotal mounting rod having first and second opposed ends, said first end of said second pivotal mounting rod being pivotally mounted to said frame, said second end of said second pivotal mounting rod being pivotally joined to said first pivotal mounting rod.

4. The portable band saw sharpener as recited in claim 3, wherein said first and second pivotal mounting rods are provided with spring means for spring-biasing said rods with respect to one another.

5. The portable band saw sharpener as recited in claim 1, further comprising a mounting track formed on said frame, said mounting track releasably and removably receiving said cam guide.

6. The portable band saw sharpener as recited in claim 1, further comprising a cam mount secured to, and projecting downwardly from, said motor, said cam being rotatably mounted on said cam mount.

7. The portable band saw sharpener as recited in claim 1, further comprising blade height adjustment means for securing a bottom end of said saw blade within said frame, said blade height adjustment means being adjustable to accommodate saw blades having varying heights.

8. The portable band saw sharpener as recited in claim 7, wherein said blade height adjustment means includes a pair of threaded nuts mounted to opposing longitudinal ends of said frame.

9. The portable band saw sharpener as recited in claim 8, wherein said blade height adjustment means includes a pair of threaded screws for engaging said pair of threaded nuts.

10. The portable band saw sharpener as recited in claim 1, wherein said locking means includes a hook member for releasably engaging said trough.

11. The portable band saw sharpener as recited in claim 10, further comprising a pivotal bar having first and second opposed ends, said first end being pivotally joined to said frame, said second end being pivotally joined to said hook member.

12. The portable band saw sharpener as recited in claim 11, further including spring biasing means, wherein said pivotal bar is spring biased with respect to said frame.

13. The portable band saw sharpener as recited in claim 12, further comprising an actuator member secured to said pivotal bar for actuation by the user.

* * * * *